United States Patent [19]

Nikiforov et al.

[11] 4,396,758

[45] Aug. 2, 1983

[54] GAS/LIQUID INTERFACIAL PREPARATION OF POLYAMIDE FIBRIDS

[76] Inventors: Vladimir A. Nikiforov, ulitsa Kirova, 7a, kv. 18; Savely A. Zhizhilev, Migalovo, DOS 22, kv. 57; Alexandr G. Mukhometzyanov, prospekt 50 let Oktyabrya, 8, kv. 6, all of Kalinin; Lev B. Sokolov, ulitsa Truda, 18, kv. 35, Vladimir; Nison I. Gelperin, 2 Oboedensky pereulok, 10, kv. 5, Moscow; Tatyana I. Nikitina, Zeleny proezd, 45, korpus 2, kv. 45, Kalinin; Viktor I. Rabinovich, Svetlanovsky proezd 52, kv. 355, Leningrad, all of U.S.S.R.

[21] Appl. No.: 220,810

[22] Filed: Dec. 29, 1980

[51] Int. Cl.³ .............................................. C08G 69/28
[52] U.S. Cl. .................................... 528/335; 528/176; 528/179; 528/194; 528/336; 528/338; 528/339; 528/340; 528/343; 528/345; 528/347; 528/348
[58] Field of Search ........................ 528/335, 348, 176

[56] References Cited

U.S. PATENT DOCUMENTS

| | | | |
|---|---|---|---|
| 2,988,782 | 6/1961 | Parrish et al. | 528/502 |
| 3,068,527 | 12/1962 | Morgan | 528/502 |
| 3,884,881 | 5/1975 | Bice et al. | 528/335 |
| 4,009,153 | 2/1977 | Shin | 528/335 |
| 4,223,105 | 9/1980 | Igonin et al. | 528/348 |

FOREIGN PATENT DOCUMENTS 261184  5/1963  Australia .
959743  6/1964  United Kingdom .

*Primary Examiner*—Harold D. Anderson
*Attorney, Agent, or Firm*—Lilling & Greenspan

[57] ABSTRACT

Fibrides of synthetic heterochain polymers are produced by a non-equilibrium polycondensation of an aqueous alkaline solution of bifunctional compounds supplied into the reaction zone as a continuous stream oriented in the horizontal plane of the reaction zone to be acylated with diacylchlorides of dicarboxylic acids in the state of a superheated vapor with a carrier supplied into the reaction zone in the vertical plane, the contacting of the reagents being effected in a cross-current stream under shear stress conditions.

An apparatus employed for carrying out the process for producing fibrides of synthetic heterochain polymers includes a vertically mounted cylindrical housing comprising a reaction chamber provided with means for admitting the liquid phase of the starting products thereinto as a continuous flow oriented in the horizontal plane of the reaction chamber; a chamber for generating the gas phase of the starting products positioned under the reaction chamber, and means for removing the reaction products from the reaction chamber provided in the upper part of the latter.

The present invention is useful in the manufacture of synthetic paper for electroengineering applications, in aviation engineering, fuel filters for diesel engines, in the production of plastics, and non-woven materials in the textile and light industries.

9 Claims, 3 Drawing Figures

GAS/LIQUID INTERFACIAL PREPARATION OF POLYAMIDE FIBRIDS

The present invention relates to the production of polymeric materials by the method of non-equilibrium polycondensation at the gas-liquid interface and, more specifically, it relates to a process for producing fibrides of synthetic heterochain polymers and apparatus for carrying out this process.

FIELD OF THE INVENTION

The present invention is useful in the manufacture of synthetic paper for electroengineering purposes and as a construction material in aviation engineering; fuel filters for diesel engines; in the production of plastic articles; and non-woven materials in the textile and light industries.

BACKGROUND OF THE INVENTION

Known in the art are processes for producing fibrides which are based on effluence of viscous solutions of polymers into a settler at a shear stress created, for example, by stirring (cf. U.S. Pat. No. 2,988,782, 1961; U.S. Pat. No. 3,068,527, 1962; British Pat. No. 959,743, 1964; Australian Pat. No. 261,184, 1965, USSR Inventor's Certificate No. 256154, 1969, Cl. D 01 F 6/00).

These prior art processes have disadvantages residing in their multi-stage character and the necessity of using large quantities of organic solvents and settling agents.

Known in the art is a process for producing fibrides in the course of synthesis of polymers under foam conditions with the supply of the monomer in the liquid phase, for example hexamethylenediamine, directly into the reaction zone of the reactor. The gas flow carried by air containing the monomer, for example terephthalic acid dichloroanhydride, is fed in an aerosol state into the reaction zone from the bottom. When the reacting phases contact, there occur chemical processes of polycondensation and neutralization of the evolving low-molecular weight substance, for example hydrogen chloride. Besides, in a highly turbulent reaction mass converted, by the kinetic head of the gas phase, to a mobile three-phase foam, the process of fibride-formation occurs to a certain extent, due to stretching of the resulting gel-like film of the polymer by the above-mentioned gas flow. The reaction mass containing: the synthetized polymer of a broad particle size and particle shapes, common salt as the product of neutralization of the low-molecular substance; water; an excess of hexamethylene and alkali; air is moved along the reactor towards the separation zone in the vertical plane following a complicated path. After the separation zone, the inert air saturated with vapors of the liquid phase is delivered to cooling and then exhausted into the atmosphere. The aqueo-alkaline suspension of the polymer after separation is subjected to filtration. The filtrate is recycled to the process with the view to utilize a excessive diamine, while the polymeric fibrides are washed, squeezed and packed (see the Report of the Kalinin Polytechnical Institute No. 7403815 "Process for the synthesis of polymers under foam-formation conditions", 1975, p. 36, deposited in VINITI, state registration No. 74035815, inv. No. 466424, 23.02.76).

This prior art process has disadvantages residing in a low yield of fibrides not exceeding 50–60%, their small size, insufficient molecular weight, non-uniformity of the polymer relative to the molecular weight and particle size, complexity of the process flow-sheet and difficulties of conducting the same under continuous conditions. Furthermore, the apparatus employed in the process necessitates additional means for fractionation of the product.

Also known is a process for producing polyamide fibrides by way of gas-liquid interphase polycondensation of haloanhydrides of dicarboxylic acids with bifunctional compounds (cf. USSR Inventor's Certificate No. 632766 of July 21, 1978). In this process the formation of fibrides occurs simultaneously with the synthesis of the polyamide from the monomers passing into the reaction zone in the liquid and gas phases. The gas stream containing the monomer such as terephthalic acid dichloroanhydride is passed, in the aerosol state from the stage of generation of the gas phase, into the reaction zone of the reactor through a perforated partition provided in the reactor between the zone of generation and the reaction zone; the free cross-section of the partition being equal to 25%. This gas stream is contacted with the liquid phase containing the monomer, for example hexamethylenediamine, supplied in the form of small drops by means of a mechanical nozzle positioned along the reactor axis above the aforementioned perforated partition. In the counter-current contacting phases there occurs, due to high kinetic energy of the gas stream, a phase inversion and the formation of a highly-turbulent layer of a movable foam having a highly-developed surface area whereupon chemical reactions of polycondensation and neutralization of the evolving hydrogen halide take place. At the same time, in the foam layer due to shear forces there occurs the formation of fibrides which are delivered, along with the reaction mass, by means of the kinetic gas stream to the zone of separation and defoaming, whereafter at the outlet of this zone they are subjected to filtration, washing, squeezing and packing.

However, the known process for producing fibrides with the nozzle-dropwise distribution of the liquid phase has certain disadvantages complicating operation of the apparatus and impairing quality characteristics of the product. The absence of the total overlapping of the cross-section of the reaction space by a continuous film part of the jet upon dropwise distribution creates non-uniformity of distribution of the liquid phase, local "breakthrough" of the monomer from the gas phase, decrease of the yield and molecular mass of the polymer. The aerosol state of the gas phase monomer does not provide for a uniform concentration of the monomer and strict equimolarity of the monomers in the reaction zone.

Known in the art are apparatus for physico-chemical and heat-exchange processes comprising a housing with a horizontal perforated partition, inlet pipe or a throttle valve for the supply of the starting components into the reaction zone, the outlet pipe for the discharge of the gas phase, as well as receiving and draining boxes for the liquid phase (see in book "Foam Conditions and Foam Apparatus", ed. by prof. I. P. Mukhlenov and prof. E. Ya. Tarat, Leningrad, "Khimija" Publishing House, 1977, pp. 16–20).

In the known apparatus there are no means ensuring the possibility for carrying out polycondensation processes, i.e. there is lack of an assembly creating conditions for generating a gas phase, regular distribution of the liquid phase, thus eliminating the use of liquid and solid monomers under normal conditions in the gas phase to obtain fibrides.

Known is an apparatus for the synthesis of polymers by the gas-phase polycondensation method which consists of three units: gas-phase generator and a reaction chamber partitioned by means of a perforated wall with the live cross-section of 25%, and a centrifuge foam suppressor. The diameter of the reaction chamber and evaporator of the gas-phase generation unit is 100 mm. To introduce the liquid phase and remove the polymer suspension, the reaction chamber is provided with corresponding pipes mounted in its side walls. Compensation of heat losses is ensured by means of a heating mantle provided at the outer surface of the reactor (cf. Report of the Kalinin Polytechnical Institute No. 74035815 "Process for the Synthesis of Polymers by the Method of Polycondensation under Foam-Formation Conditions", 1975, pp. 48–55, deposited in VINITI on Feb. 25, 1975. state registration No. 74035815, entry No. B 383154). However, due to the specific character of distribution of the liquid phase over the cross-section of the reactor over the partition this prior art apparatus has certain disadvantages. The polymer produced in this apparatus has a structural non-uniformity, contains a substantial portion of a low-molecular powder-like fractions, and features a relatively low average molecular weight and a small yield of fibrides. When the apparatus operation is stopped, the polymer suspension accumulated in the expander of the foam depressor drops through the perforated partition, contaminates the throttle valve and nozzle of the unit for the gas-phase generation, thus necessitating labor-consuming operations of dismantling and cleaning of the apparatus and increasing operating costs of the plant as a whole.

Also known are diffuser-foam apparatus containing no partitions and intended for carrying out the processes of heat and mass transfer under highly turbulent conditions. Such apparatus has a vertical conically-shaped diffuser with a narrow neck, whereinto gas is fed. The spraying liquid is introduced into the upper enlarged section of the diffuser. The advantage of the apparatus resides in the absence of clogging with dust (cf. in book "Foam Conditions and Foam Apparatus", ed. by prof. I. P. Mukhlenov and prof. E. Ya. Tarat, Leningrad, "Khimija" Publishers, 1977, p. 234).

However, this prior art design of the apparatus does not make it possible to carry out chemical processes of polycondensation in an intensive hydrodynamic stream to produce fibrides.

It is an object of the present invention to provide such a process which would ensure a full formation of a synthetic polymer to fibrides with an increased molecular mass and the same particle size over the entire cross-section of the reaction zone.

It is another object of the present invention to provide such a process for producing fibrides of synthetic heterochain polymers which would make it possible to simplify filtration of the suspension of the obtained product and washing of the polymer.

It is still another object of the present invention to provide such an apparatus for carrying out the process for producing fibrides of synthetic heterochain polymers which would make it possible to increase the efficiency of utilization of the working space of the reaction zone of the apparatus.

It is a further object of the present invention to provide such an apparatus for carrying out the process for producing fibrides of synthetic heterochain polymers which would make it possible to eliminate exhaust of pollutants into the environment.

SUMMARY OF THE INVENTION

These objects are accomplished by the production of fibrides of synthetic heterochain polymers by a process involving non-equilibrium polycondensation of an aqueous alkaline solution of bifunctional compounds to be acylated with diacyl chlorides of dicarboxylic acids being supplied into the reaction zone and subsequent recovery of the desired product. In accordance with the present invention, into the reaction zone there are fed an aqueous alkaline solution of the bifunctional compounds as a continuous stream oriented in the horizontal plane of the reaction zone and dichloroanhydrides of dicarboxylic acids in the state of a superheated vapor with a carrier being supplied in the vertical plane, the contact between said reagents being effected in a cross-current under shear stress conditions.

The present invention makes it possible to use heat-resistant fibrides of aromatic and aliphaticaromatic heterochain polymers suitable for the manufacture of synthetic paper for electroengineering application, Class F; Their manufacture avoids the use of organic solvents and scarce settling agents and the production cost of the resulting fibrides as compared to phenyl fibride (based on polymetaphenyleneisophthalamide) is reduced by more than 15 times. The yield of fibrides based on the resulting polymer is equal, owing to the present invention, to 100% and the molecular mass of the polymer is increased by 1.5-2 times. The process according to the present invention makes it possible to ensure uniformity of particles of the produced fibrides. Furthermore, uniformity of size and shape of polymeric particles makes it possible to eliminate from the process, the stage of fractionation of the polymer and deliver the entire aqueous suspension of the polymer directly to filtration and washing.

According to the present invention, it is advisable to use superheated steam or air as the carrier of superheated vapor of dichlorodiacyl chlorides of dicarboxylic acids.

The use, as the carrier, of superheated steam or air ensures the production of fibrides featuring high quality characteristics at a high yield value. At the same time, the use of steam eliminates pollution of the atmosphere with harmful exhausts, and avoids condensation and foam suppression.

To increase productivity of the process according to the present invention by 25 times as compared to the prior art process, it is advisable that the concentration of diacyl chlorides of dicarboxylic acids supplied into the reaction zone be equal to 0.1-5 mol/m$^3$ of the carrier.

To enhance productivity of the process for producing fibrides and increase molecular mass of synthetic heterochain polymers by 1.5 times, it is advisable that polycondensation, according to the present invention be conducted at a pressure of from 0.5 to 2 atm and a temperature of from 90° to 105° C. The linear speed of the carrier of diaryl chloride of dicarboxylic acids is within the range of from 2 to 12 m/sec, and the speed of injection of the continuous stream of the aqueo-alkaline solution into the reaction zone is 0.5 to 6 m/sec.

An embodiment of the present invention is that in carrying out the process for producing fibrides of synthetic heterochain polymers, use is made of an apparatus comprising a vertically mounted cylindrical housing with a reaction chamber and a chamber for generating the gas phase of the starting products positioned under the reaction chamber with means for supplying the liquid and gas phases into the reaction chamber and means for withdrawing the reaction products from the reaction chamber. In accordance with the present invention in the reaction chamber means are provided for introducing thereinto the liquid phase of the starting products as a continuous stream oriented in the horizontal plane of the reaction chamber and in the generation chamber means are provided for introducing the gaseous phase of the starting products in the vertical plane.

In accordance with the present invention, it is advisable that the means for introduction of the liquid phase contain a shell coaxially mounted outside the reaction chamber at such a distance from the reaction chamber that between the outer wall thereof and the inner wall of the shell a cavity is formed communicating with the reaction chamber through a clearance made in the lower portion of the reaction chamber and having a constant height equal to 0.02–0.06 of the diameter of the reaction chamber. The latter is also provided with means for ensuring creation of the required dynamic head of the gas phase at the point of its contact with the liquid phase.

Furthermore, according to the present invention, it is desirable that the above-mentioned means be made as a horizontal perforated partition with a live cross-section of from 18 to 40%, said partition being under the above-specified clearance at a distance therefrom of at least 0.015 and at most 0.1 of the height of the reaction chamber.

In accordance with the present invention, it is also advisable that this means be made in the form of two tapered cones positioned inside the reaction chamber and shaping it, said tapered cones being connected therebetween in the site of the minimum diameter with the formation, at their joint, of a clearance having its height constant over the entire diameter of the tapered cone and equal to 0.02–0.06 of the value of the maximum diameter of the cone. The ratio of the minimum diameter of one of the tapered cones to its maximum diameter is equal to 2.5–2:1 and the ratio of the height of the tapered cone to its minimum diameter ranges from 4:1 to 5:1.

Furthermore, in accordance with the present invention it is desirable that the means for introducing the liquid phase have a mechanical slit nozzle with a guide angle opening of from 110° to 180° mounted along the axis of the reaction chamber in such a manner that the slit of said nozzle be positioned at a distance of from 0.1 to 0.04 of the height of the reaction chamber from the horizontal perforated partition mounted in the lower part of the reaction chamber having a live cross-section of from 18 to 40%.

The present invention is further illustrated by the following detailed description of the process for producing synthetic heterochain polymers and the apparatus for carrying out this process with reference to the accompanying drawings, wherein.

DETAILED DESCRIPTION OF THE INVENTION

Figure 1:
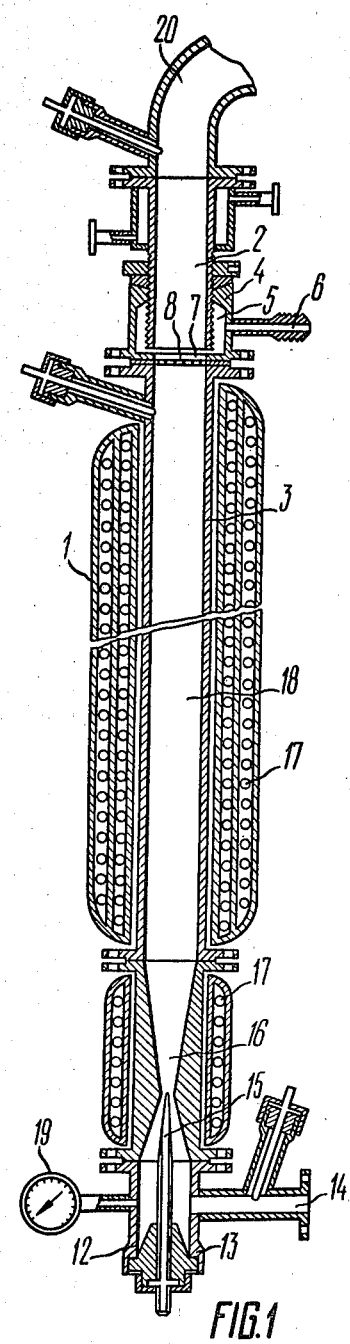
FIG. 1 shows the apparatus for the production of fibrides of synthetic heterochain polymers (elevation view)

Described hereinbelow is the process for producing fibrides of synthetic heterochain polymers, e.g. fibrides of polyhexamethyleneterephthalamide, polyhexamethyleneisophthalamide, polymetaxylyleneterephthalamide, polyhexamethyleneoxamide.

The process according to the present invention is based on a non-equilibrium polycondensation of an aqueous alkaline solution of bifunctional compounds to be acylated with diacyl chlorides of dicarboxylic acids. The liquid phase monomers to be acylated can be diamines and dihydric phenols.

As the diamines, use may be made of aliphatic diamines such as ethylenediamine, tetramethylenediamine, hexamethylenediamine, dodecamethylenediamine, a mixture of ethylenediamine with hexamethylenediamine; cycloaliphatic diamines such as piperazine, N,β-aminoethylenepiperazine, methylpiperazine; aromatic diamines such as metaxylylenediamine, paraxylylenediamine, and a mixture of para- and meta-xylylenediamines.

As the dihydric phenols, use can be made of, for example, 4,4'-dihydroxydiphenylpropane, phenolphthalein, resorcinol, and hydroquinone.

As the dichloroanhydrides of dicarboxylic acids, use can be made of diacyl chlorides of aliphatic dicarboxylic acids such as oxalic acid, glutaric acid, azelaic acid, adipic acid, sebacic acid, fumaric acid; dichloroanhydrides of aromatic dicarboxylic acids such as isophthalic acid, terephthalic acid, diphenyloxide-4,4'-dicarboxylic acid; a mixture of dichloroanhydrides of fumaric and terephthalic acid, and a mixture of dichloroanhydrides of isophthalic and terephthalic acids.

As the organic solvents inert relative to diacyl chlorides of dicarboxylic acids employed for liquefaction of solid (under normal conditions) dichloroanhydrides of dicarboxylic acids, use can be made of hydrocarbons (such as heptane and benzene), chlorinated hydrocarbons (such as methylenechloride, chloroform, dichloroethane), ethers and esters (such as ethyl ether, tetrahydrofuran), ketones (such as acetone, methylethylketone), anhydrous organic acids (such as formic acid and acetic acid) and the like, though it is most preferable to use methylene chloride (dichloromethane).

The process according to the present invention makes it possible to produce fibrides of both homopolymers and copolymers using in the process of the gas-phase polycondensation both individual diamines, diphenols and dichloroanhydrides of dicarboxylic acids, and mixtures of diamines and diacyl chlorides of dicarboxylic acids.

According to the process of the present invention, an aqueous alkaline solution of bifunctional compounds to be acylated is fed into the reaction chamber as a continuous stream oriented in the horizontal plane of the reaction zone. In doing so, according to the present invention, diacyl chlorides of dicarboxylic acids in a state of super heated vapor with a carrier are fed into the reaction zone in its vertical plane and contacting of the reagents is effected in a cross-current under conditions of shear stress.

As the carrier of superheated vapor of diacyl chlorides of dicarboxylic acids in the process according to the present invention use is made of superheated steam or air. The concentration of diacyl chlorides of dicarboxylic acids supplied into the reaction zone is 0.1 to 5 mol/m$^3$ of the carrier.

When the starting reagents are supplied into the reaction zone following the procedure according to the present invention, the liquid phase (supplied in the horizontal plane) is contacted with the gas phase (supplied in the vertical plane) in a cross-current manner.

From a thin layer of the liquid phase the acylated bifunctional monomer diffuses to the phase contact surface, wherein there occurs an instantaneous or rapid reaction of polycondensation with the formation of a gel-like film of a synthetic hetero-chain polymer, while the low-molecular substance evolving during the reaction of irreversible polycondensation, i.e. hydrogen chloride, diffuses into the aqueous alkaline solution, wherein it is neutralized with an alkali such as caustic soda. The molar ratio of the monomers in the reaction zone is varied depending on the accuracy of metering the latter within the range of from 1.05 to 2 moles of the monomer to be acylated, e.g. diamine per 1 mol of diacyl chloride of a dicarboxylic acid. Due to the fact that the polycondensation proceeds under conditions of shear stress caused by high speed of the gas and liquid phases and their interaction in the cross-current, there takes place the formation of fibrides from the gel-like film of the synthetized polymer during the film formation under the effect of shear stress. Under the action of the dynamic head of the gas phase in the reaction zone there occurs inversion of the phases and the formation of a highly turbulent three-phase mobile foam having a highly developed surface, whereupon the process of formation of fibrides and chemical processes are completed. The presence of a developed polymeric matrix of the mobile foam stabilizes it at a linear speed of the gas phase exceeding the upper limit of linear speeds of the foam condition range under the formation of a usual gas-liquid emulsion (two-phase foam).

In the process according to the present invention the polycondensation is to be conducted under a pressure of from 0.5 to 2 atm and at a temperature within the range of from 90° to 105° C.

It has been found that carrying out the process at an elevated temperature and superatmosphere pressure in the reaction zone lowers solubility of diacyl chlorides of dicarboxylic acids in the liquid phase and the probability of their saponification, and increases the polymer yield.

It has been found advantageous that the linear speed of the carrier of diacyl of dicarboxylic acids be within the range of from 2 to 12 m/sec and the speed of injection of the continuous stream of the aqueous alkaline solution into the reaction zone be equal to 0.5–6 m/sec.

The process according to the present invention makes it possible to produce heat-resistant fibrides of aromatic and aliphatic-aromatic heterochain polymer suitable for the manufacture of, for example, synthetic paper for electroengineering applications. The yield of fibrides, as calculated for the resulting polymer, is 100% and the molecular mass of the resulting polymer expressed through values of logarithmic viscosity of a solution of this polymer in sulphuric acid of the concentration of 0.5 g/dl is equal to 0.4–1.5 dl/g. The process according to the present invention makes it possible to ensure uniformity of particle size of the obtained fibrides.

In accordance with the present invention, it is desirable to carry out this process in an apparatus comprising a vertically mounted cylindrical housing 1 (FIG. 1) made of a stainless and refractory steel. The housing comprises a reaction chamber 2 and, positioned thereunder, a chamber 3 for generating the gas phase of the starting products-diacyl chlorides of dicarboxylic acids. The volume of the reaction chamber 2 does not exceed 2-5% of the whole volume of the apparatus. The reaction chamber 2 contains means for admitting the liquid phase of the starting products, i.e. an aqueous alkaline solution of bifunctional compounds thereinto to be acylated as a continuous stream oriented in the horizontal plane of the reaction chamber 2.

In one embodiment of the apparatus according to the present invention the means for admitting the liquid phase into the reaction chamber 2 is a shell 4 coaxially mounted outside the reaction chamber 2 at such a distance therefrom that a cavity 5 is formed between the external wall of the reaction chamber 2 and the inner wall of the shell 4.

The shell 4 is provided with an inlet pipe 6 for the supply of the liquid phase into the cavity 5. The shell 4 is secured to the reaction chamber 2 by means of threading provided at the external surface of the reaction chamber 2.

The distance at which the shell 4 is spaced from the reaction chamber 2 may be equal to, for example, 3–5 mm. In the lower portion of the reaction chamber 2 there is a clearance 7 having its height constant over the entire diameter of the reaction chamber 2 and equal to 0.02–0.06 of the diameter of the reaction chamber 2.

Through the clearance 7 the above-mentioned cavity 5 communicates with the reaction chamber 2. It has been found that the clearance of the above-specified size ensures the effluence of the aqueous alkaline solution of the bifunctional monomer to be ocylated into the reaction chamber 2 at a given speed equal, as it has been mentioned hereinabove, to 0.5–6 m/sec. The volume of cavity 5 corresponding to the above-mentioned distance spacing the shell 4 from the reaction chamber 2 ensures a continuous stream of the liquid phase oriented in the horizontal plane of the reaction chamber 2.

Besides, in the reaction chamber 2 there is a means ensuring creation of the required dynamic head of the gas phase at the site of its contact with the liquid phase; the head value should be sufficient for the phase inversion and formation of developed foaming conditions.

This means can be a horizontally mounted in the bottom section of the reaction chamber 2, partition 8 with a live cross-section of from 18 to 40%. The perforated partition 8 is mounted in the lower section of the reaction chamber 2 under the clearance 7 at such a distance therefrom, so that the gas phase supplied upwardly in the vertical plane has a sufficient kinetic head. This distance should constitute, as it has been found according to the present invention, at least 0.015 and at most 0.1 the height of the reaction chamber 2.

In accordance with the present invention, the means ensuring creation of the required dynamic head of the gas phase at the site of its contact with the liquid phase can be also embodied as two tapered cones 9 and 10 (FIG. 2) positioned in the reaction chamber 2 and substantially shaping it. These tapered cones 9 and 10 are connected therebetween at the site of the minimum diameter thereof with the formation, at the joint, of a clearance 7 having constant height over the entire diameter of the tapered cone 9 or 10 equal to 0.02-0.06 of the value of the maximum diameter of cone 9 or 10. It should be noted that these tapered cones 9 or 10 should be of such a size which ensures the ratio of the maximum diameter of one of the tapered cones 9 or 10 to its minimum diameter be equal to 2.5-2:1 and the ratio of the tapered cone height to the minimum diameter be equal to 4-5:1.

The reaction chamber 2 formed by two tapered cones 9 and 10 has an inlet pipe 6 for the supply of the liquid phase of the starting products into the reaction chamber 2.

Figure 3:
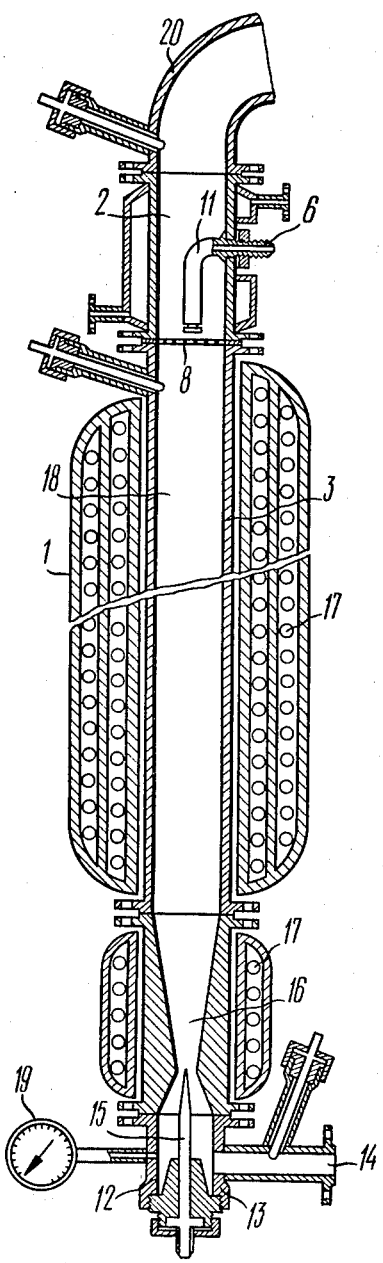
FIG. 3 is still another embodiment of the apparatus according to the present invention for the production of fibrides of synthetic heterochain polymers (elevation view).

The present invention also stipulates the following embodiment of this means for admitting the liquid phase into the reaction chamber 2. This means contains a mechanical slit nozzle 11 (FIG. 3) with an opening guide angle of such value which ensures fullness of overlapping of the reaction chamber 2 cross-section (i.e. a continuous flow of the liquid phase is created oriented in the horizontal plane), or with an opening angle of from 110° to 180°. The mechanical slit nozzle 11 is positioned along the axis of the reaction chamber 2 in such a manner that the slit of said nozzle 11 is spaced at such a distance from the surface of the horizontal perforated partition 8 at which the gas phase supplied from the bottom into the reaction chamber 2 has a dynamic head sufficient for foaming and fibride-formation. It has been found that the slit of nozzle 11 should be positioned over the horizontal perforated partition 8 at a distance therefrom equal to 0.1-0.04 of the height of the reaction chamber 2.

The casing of the nozzle 11 having a turning angle of 90° from the horizontal to the vertical plane is fixed to the wall of the reaction chamber 2 by means of a threaded joint.

The means for admitting the gas phase into the reaction chamber 2 are provided in the lower section of the generation chamber 3 and comprise a nozzle-type mixer 12 (FIG. 1) comprising a cylindrical housing 13 with an inlet pipe 14 intended for the admission of the carrier and a tuyere 15 for the supply of a liquefied diacyl chloride of a dicarboxylic acid into a diffuser 16 provided with electrical heating members 17. The diffuser 16 is mounted to an evaporator-superheater 18 comprising substantially the upper portion of the generation chamber 3 by means of simple flange joints. The nozzle-type mixer 12 is provided with a commercial pressure gauge 19.

The evaporator-superheater 18 is fixed to the reaction chamber 2 positioned thereover by means of a simple flange joint.

Certain embodiments of the apparatus according to the present invention (FIGS. 1 and 3) contemplate the use of a perforated partition 8 in the flange joint.

The means for the withdrawal of the reaction products from the reaction chamber 2 are provided in the upper part thereof in the form of an outlet pipe 20.

The above-described apparatus according to the present invention operates in the following manner.

Figure 2:
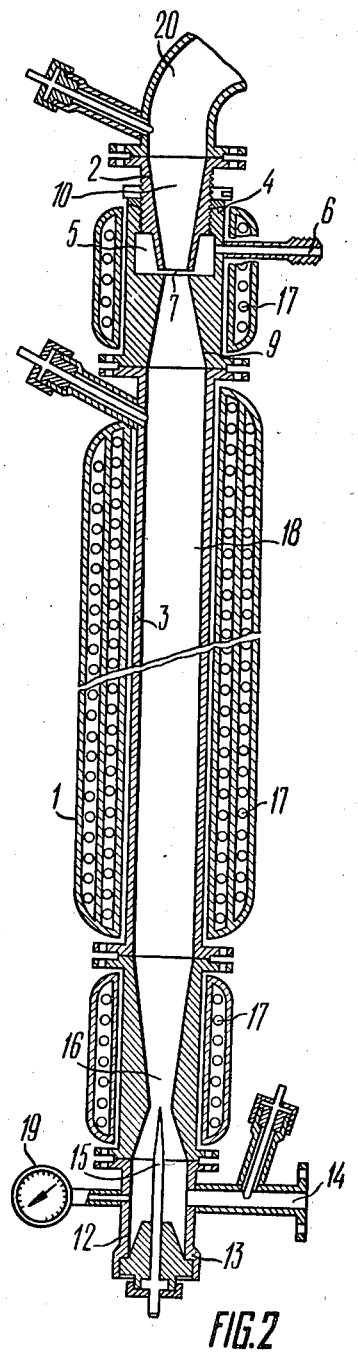
FIG. 2 is a view of another embodiment of the apparatus for the production of fibrides of synthetic heterochain polymers (elevation view)

A liquid or liquefied (as a melt or a concentrated solution) diacyl chloride of a dicarboxylic acid is admitted under pressure of an inert gas into the tuyere 15 of the nozzle mixer 12. The liquid effluent from the tuyere 15 in the diffuser 16 contacts the carrier (superheated steam or air heated to a temperature above the dichloroanhydride melting point) supplied from the inlet pipe 14. A mist-like aerosol is formed due to the internal and external heat-exchange which undergoes phase transformations in the evaporator-superheater 18. The generated vapor-gas mixture at a temperature equal to or exceeding the boiling temperature of the bifunctional monomer to be acylated at a given concentration thereof in the gas phase is passed onto the perforated partition 8 (FIGS. 1 and 3) or into the tapered cone 9 or 10 located directly over the generation chamber 3 (FIG. 2). The speed at which the generated vapor-gas mixture passes into the lower part of the reaction zone 2 is equal to 2-12 m/sec. However, due to the fact that in the lower part of the reaction chamber the vertically ascending vapor-gas stream is contacted with the horizontal perforated partition 8 (FIGS. 1 and 3) or passes into the tapered cone 9 with its volume decreasing at the top, there is observed an increase of the linear speed of the vapor-gas stream. The kinetic energy of the vapour-gas stream is increased proportionally to the square of increase in its linear speed.

Simultaneously with the introduction, into the generation chamber, of a vapor-gas mixture of a diacyl chloride of a dicarboxylic acid, through the inlet pipe 6 into the cavity 5 formed between the outer wall of the reaction chamber 2 and the inner wall of the shell 4 (FIGS. 1 and 2) or through the duct of the mechanical slit nozzle 11 (FIG. 3) there is admitted an aqueous-alkaline solution of a bifunctional monomer to be acylated (liquid phase). The liquid phase is supplied under a head equal to the pressure in the reaction chamber 2 created by a centrifugal pump (not shown). Due to the presence of the clearance 7 through which the cavity 5 communicates with the reaction chamber 2, the flow of the aqueous-alkaline solution of the bifunctional monomer to be acylated is fed, strictly in the horizontal plane, into the reaction chamber 2 (FIGS. 1 and 2) as a continuous thin film at a speed of from 0.5 to 6 m/sec. In the case of admitting the aqueous alkaline solution of the bifunctional monomer to be acylated into the reaction chamber 2 through the mechanical slit nozzle 11, there also occurs the formation of a thin continuous film of the liquid phase admitted into the reaction chamber at a speed of from 0.5 to 6 m/sec.

Therefore, at a distance from the surface of the perforated partition 8 equal to 0.015-0.1 of the height of the reaction chamber or directly over the upper part of the narrow portion of the tapered cone 9 (FIG. 2) there occurs the interaction of the liquid and gas phases under the most intensive hydrodynamic conditions. At the same time there takes place chemical processes of polycondensation with the formation of a polymeric film and neutralization of the evolving low-molecular substance, hydrogen chloride. Due to the high kinetic energy of the vapor-gas stream accumulated upon passing the latter through the perforated partition 8 or narrow portion of the tapered cone 9, as well as the high rate of effluence of the liquid phase from the annular slit 7, in the cross-counter contact of the liquid and gas phase there are considerable shear stresses, thus ensuring the formation of long-fiber fibrides directly in the reaction chamber 2 from the polymeric film obtained as a result of interaction of the starting components. In the bulk of the highly-turbulent mobile layer of three-phase foam withdrawn from the reaction chamber 2 by the kinetic stream of the vapor-gas phase through the outlet pipe 20 into a collecting separator (not shown) there occur further processes of propagation and rupture of the polymeric chain and fibride- formation.

It should be noted that the process of forming a polymeric film-polycondensation should be preferably carried out at a pressure of from 0.5 to 2 atm at a temperature within the range of from 90° to 105° C.

For a better understanding of the present invention the following specific examples are given hereinbelow by way of illustration.

EXAMPLE 1

A 0.1 M aqueous-alkaline solution of hexamethylenediamine at a volume rate of 452 l/hr and concentration of caustic soda of 0.13 mol/l preheated to a temperature of 99°–102° C. is fed through the radial inlet pipe into the cavity 5 formed between the reaction chamber 2 and the shell 4 (inside diameter of the reaction chamber is 50 mm) and uniformly over the entire circumference exits at a speed of 0.94 m/sec through the clearance 7 into the reaction chamber 2 forming a continuous film of the liquid phase at a distance of 4 mm from the surface of the perforated partition 8. A solution of terephthalic acid diacyl chloride in methylene chloride with a concentration of 400 g/l and at a volume rate of 11.5 l/hr at a nitrogen pressure of 3.5 atm.g. is fed into the tuyere 15 of the nozzle mixer 12. The liquid torch effluent from the tuyere 15 in the diffuser 16 is contacted with air supplied through the inlet pipe 14 at a rate of 56.5 m³/hr while being preheated to a temperature of 160° C. Upon the interaction of the streams there is formed a mist-like aerosol of terephthalic acid diacyl chloride which is further converted in the chamber 3 for generation of the gas phase into a vapor-gas mixture superheated to a temperature of 190° C. At this temperature the vapor-gas mixture through the perforated partition 8 with a free section of 25% is passed to the reaction chamber 2 and contacted with the liquid phase at a molar ratio of the monomers in the contacting phases of 2:1 (excess of hexamethylenediamine). Under a pressure of 2 atm.g. there occur chemical reactions of polyamidation and neutralization. From the resulting gel-like film of polyhexamethyleneterephthalamide (polyamide-6T) under the effect of shear stress from contact between the phases, fibrides are formed. The reaction mass is passed into a collecting separator through the outlet pipe 20 by the dynamic head of the gas stream. Inert gases, water vapors and vapors of methylene chloride are fed to a cooling condenser through a hollow shaft of the foam suppressor. The water condensate and that of methylene chloride from the drop deflector are delivered to separation and air is vented to the atmosphere. The aqueous suspension is fed into a receiving filter. The filtrate with the content of hexamethylenediamine of 0.05 mol/l is fed by means of a centrifugal pump to the collector of the liquid phase and fibrides are washed with water to a neutral reaction, compressed in a centrifuge to a moisture content of 82% and packed into polyethylene bags.

The logarithmic viscosity of a solution of the polymer in sulphuric acid with a concentration of 0.5 g/dl is 1.1 dl/g.

The yield of polyhexamethyleneterephthalamide as calculated on terephthalic acid diacyl chloride is 98%, the yield of fibrides as calculated for the resulting polyhexamethyleneterephthalamide is 96%. The Shopper-Riegler fineness of the fibrides is 90°.

EXAMPLE 2

Under conditions similar to those described in the foregoing Example 1, from hexamethylenediamine and terephthalic acid diacyl chloride polyhexamethyleneterephthalamide is produced with the only difference being that the molar ratio of hexamethylenediamine to terephthalic acid dichloroanhydride is maintained equal to 1.1:1.

The logarithmic viscosity of the polymer solution in sulphuric acid with a concentration of 0.5 g/dl is 1 dl/g.

The yield of the polymer as calculated for terephthalic acid diacyl chloride is 95%, the and yield of fibrides as calculated for the resulting polyhexamethyleneterephthalamide is 96%. The Shopper-Riegler fineness of the fibrides is 90°.

EXAMPLE 3

Under conditions similar to those described in Example 1, from hexamethylenediamine and terephthalic acid diacyl chloride polyhexamethyleneterephthalamide is obtained with the only difference being that for the gas phase generation use is made of a melt of terephthalic acid diacyl chloride at a temperature of 130° C. The concentration of terephthalic acid diacyl chloride in the gas phase is 0.93 mol/m³. The molar ratio of the monomers in the contacting phases is 1.5:1 (excess of hexamethylenediamine), the speed of effluence of the liquid phase from the annular slit into the reaction zone is 1.2 m/sec. The gas phase temperature at the inlet into the reaction chamber 2 is 170° C. The logarithmic viscosity of the polymer solution in sulphuric acid with concentration of 0.5 g/dl is 0.96 dl/g. The yield of the polymer as calculated for terephthalic acid diacyl chloride is 99%. The Shopper-Riegler fineness of fibrides is 85°. The average weighed length of the fibrides is 170 dcg.

EXAMPLE 4

A 0.1 M aqueous alkaline solution of hexamethylenediamine at volume rate of 452 l/hr and concentration of caustic soda of 0.13 mol/l preheated to a temperature of 99°–102° C. is fed through the radial inlet pipe 6 into the cavity 5 formed between the reaction chamber 2 and shell 4 (the inside diameter of the reaction chamber 2 is 50 mm) and exits, uniformly along the entire circumference, at speed of 5.94 m/sec through the clearance 7 into the reaction chamber 2 while forming a continuous film of liquid phase at distance of 4 mm from the surface of the perforated partition 8. The melt of terephthalic acid diacyl chloride having a temperature of 130° C. at the volume rate of 11.5 l/hr at a pressure of 3.5 atm.g. is fed into the tuyere 15 of the nozzle-type mixer 12. The liquid torch effluent from the tuyere 15 is contacted in the diffuser 16 with air supplied through the inlet pipe 14 at a volume rate of 56.3 m³/hr and preheated to a temperature of 160° C. The concentration of terephthalic acid diacyl chloride in the gas phase is 4 mol/m³. Upon the interaction of the streams there is formed a mist-like aerosol of terephthalic acid diacyl chloride further converted, in the gas-phase generation chamber 3, to a vapor-gas mixture superheated to a temperature of 200° C. At this temperature the vapor-gas mixture through the perforated partition 8 with a live cross-section of 25% is passed to the reaction chamber 2 and contacted with the liquid phase at a molar ratio of the monomers in the contacting phases of 1.1:1 (excess of hexamethylenediamine). In doing so, at a pressure of 2 atm there occur chemical reactions of polyamidation and neutralization. From the resulting gel-like film of polyhexamethyleneterephthalamide (polyamide-6T), fibrides are formed under the effect of the shear stress originating upon the contact between the phases. The reaction mass is fed to a collecting separator through the outlet pipe 20 by means of the dynamic head of the gas stream. Inert gases, vapors of water through a hollow shaft of the foam suppressor are delivered to a cooling condenser. The condensate of water after the drop deflector is delivered to separation while air is vented to the atmosphere. The aqueous suspension is fed to a receiving filter. The filtrate with the content of hexamethylenediamine of 0.05 mol/l is fed to the collector of the liquid phase. The fibrides are washed with water to a neutral reaction, compressed in a centrifuge to a moisture content of 82% and packed into polyethylene bags.

The logarithmic viscosity of the polymer solution in sulphuric acid with a concentration of 0.5 g/dl is 0.8 dl/g. The yield of the polymer as calculated for terephthalic acid anhydride is 90%, the yield of fibrides as calculated for the resulting polyhexamethyleneterephthalamide is 100%. The degree of fineness (according to Shopper-Riegler) is 100°, the average weighed length thereof is 165 dcg.

EXAMPLE 5

Under the conditions similar to those described in Example 1, from hexamethylenediamine and isophthalic acid diacyl chloride polyhexamethyleneisophthalamide is obtained.

The logarithmic viscosity of the polymer solution in sulphuric acid with the concentration of 0.5 g/dl is 0.76 dl/g. The yield of polyhexamethyleneisophthalamide as calculated for isophthalic acid diacyl chloride is 99.9%. The yield of fibrides as calculated for the obtained polyhexamethyleneisophthalamide is 100%. The degree of fineness (Shopper-Riegler) of the fibrides is 60°. The polymer melting point is 205° C.

EXAMPLE 6

Under conditions similar to those described in Example 1, from hexamethylenediamine and a mixture of diacyl chlorides of isophthalic and terephthalic acids taken in a ratio of 1:1, there is obtained a copolyamide of hexamethylenediamine and dichloroanhydrides of isophthalic and terephthalic acids.

The logarithmic viscosity of the polymer solution in sulphuric acid with a concentration of 0.5 g/dl is 0.7 dl/g. The polymer yield as calculated for the total of dichloroanhydrides of isophthalic acid and terephthalic acid is 97%, the yield of fibrides as calculated for the obtained copolyamide is 100%. The degree of fineness (Shopper-Riegler) of the fibrides is 70°. The melting point of the polymer is 280° C.

EXAMPLE 7

A 0.1 M aqueous alkaline solution of hexamethylenediamine preheated to a temperature of 99° C. is fed, at a volume rate of 788 l/hr, into an annular clearance 7 with a height of 1.5 mm formed between tapered cones 9 and 10 having the minimum diameter of 25 mm. The gas phase generated from the melt of terephthalic acid diacyl chloride and containing 0.93 mol/m$^3$ of carrier (air) for terephthalic acid diacyl chloride is continuously fed at a volume rate of 56.5 m$^3$/hr into the tapered cone 9 of the reaction chamber 2. Its temperature at the inlet of the reaction chamber 2 is 150° C. The resulting fibrides of polyhexamethyleneterephthalamide in the composition of the reaction mass are subjected to a further treatment following the procedure described in Example 1 hereinbefore.

The logarithmic viscosity of the polymer solution in sulphuric acid with a concentration of 0.5 g/dl is equal to 1.06 dl/g. The yield of polyhexamethyleneterephthalamide as calculated for terephthalic acid diacyl chloride is 98%, the yield of fibrides as calculated for the obtained polyhexamethyleneterephthalamide is 99%. The Shopper-Riegler fineness of the fibrides is 100°; their average weighed length is 156 dcg.

EXAMPLE 8

Under conditions similar to those specified in Example 7, from hexamethylenediamine and a mixture of diacyl chlorides containing 9 parts by weight of isophthalic acid diacyl chloride, there is obtained a copolyamide of hexamethylene and diacyl chlorides of isophthalic and terephthalic acids. The logarithmic viscosity of the polymer solution in sulphuric acid with a concentration of 0.5 g/dl is equal to 1.06 dl/g. The yield of the copolyamide as calculated for the total diacyl chlorides of terephthalic and isophthalic acids is 95%, the yield of fibrides as calculated for the resulting copolyamide is 100%. The Shopper-Riegler fineness of the fibrides is 84°.

EXAMPLE 9

Under conditions similar to those specified in Example 7, from hexamethylenediamine and a mixture of diacyl chlorides containing 4 parts by weight of terephthalic acid diacyl chloride and 1 part by weight of isophthalic acid diacyl chloride, there is obtained a copolyamide of hexamethylenediamine and diacyl chlorides of terephthalic and isophthalic acids. The logarithmic viscosity of the polymer solution in sulphuric acid with a concentration of 0.5 g/dl is 1.2 dl/g. The yield of the copolyamide as calculated for the total of diacyl chlorides of terephthalic and isophthalic acids is 99%, the yield of fibrides based on the produced copolyamide is 100%. The Shopper-Riegler fineness of the fibrides is 80°.

EXAMPLE 10

Under conditions similar to those of Example 7, from hexamethylenediamine and a mixture of diacyl chlorides containing 3 parts by weight of terephthalic acid diacyl chloride and 1 part by weight of isophthalic acid diacyl chloride, a copolyamide of hexamethylenediamine and diacyl chloride of terephthalic and isophthalic acids is obtained. The logarithmic viscosity of the polymer solution in sulphuric acid with a concentration of 0.5 g/dl is 1.06 dl/g. The yield of the copolyamide as calculated for the total dichloroanhydrides of terephthalic and isophthalic acids is 94%, the yield of fibrides as calculated for the obtained copolyamide is 99%. The Shopper-Riegler fineness of the fibrides is 75°.

EXAMPLE 11

Under conditions similar to those described in Example 7, from metaxylylenediamine and terephthalic acid diacyl chloride poly-meta-xylyleneterephthalamide is obtained. The logarithmic viscosity of the polymer solution in sulphuric acid with a concentration of 0.5 g/dl is 0.44 dl/g. The yield of poly-meta-xylyleneterephthalamide as calculated for terephthalic acid diacyl chloride is 90%, the yield of fibrides as calculated for the obtained poly-meta-xylyleneterephthalamide is 95%. The Shopper-Riegler fineness of the fibrides is 70°.

EXAMPLE 12

Under conditions similar to those of Example 7, from metaxylylenediamine and isophthalic acid diacyl chloride poly-meta-xylyleneisophthalamide is obtained. The logarithmic viscosity of the polymer solution in sulphuric acid with a concentration of 0.5 g/dl is 0.7 dl/g. The yield of poly-meta-xylyleneisophthalamide, as calculated for isophthalic acid diacyl chloride, is 95%, the yield of the fibrides as calculated for the obtained poly-meta-xylyleneisophthalamide is 98%. The Shopper-Riegler fineness of the fibrides is 75°.

EXAMPLE 13

Under conditions similar to those described in Example 7, from a mixture containing 75% of meta-xylylenediamine and 25% of para-xylylenediamine, and terephthalic acid diacyl chloride there is obtained a copolyamide of meta- and paraxylylenediamine and terephthalic acid diacyl chloride. The logarithmic viscosity of the polymer solution in sulphuric acid with a concentration of 0.5 g/dl is 0.12 dl/g. The yield of the copolyamide is 80% as calculated for terephthalic acid diacyl chloride. The fibrides have a small particle size. The Shopper-Riegler fineness is 50°.

EXAMPLE 14

Under conditions similar to those specified in Example 7, from a mixture containing 75% of meta-xylylenediamine and 25% of para-xylylenediamine and isophthalic acid diacyl chloride there, is obtained a copolyamide of meta- and para-xylylenediamines and isophthalic acid diacyl chloride. The logarithmic viscosity of the polymer solution in sulphuric acid with a concentration of 0.5 g/dl is equal to 0.4 dl/g. The yield of the copolymamide as calculated for isophthalic acid diacyl chloride is 91%. The Shopper-Riegler fineness of the fibrides is 70°.

EXAMPLE 15

Under conditions similar to those specified in Example 1, from hexamethylenediamine and oxalic acid diacyl chloride, except that in the gas phase there is a lack of organic solvent and the gas phase temperature at the inlet of the reaction chamber 2 is equal to 125° C., and polyhexamethyleneoxamide is obtained. The logarithmic viscosity of the polymer solution in sulphuric acid with a concentration of 0.5 g/dl is 1.5 dl/g. The yield of polyhexamethyleneoxamide as calculated for oxalic acid diacyl chloride is 99%. The yield of fibrides based on the resulting polyhexamethyleneoxamide is 100%. The Shopper-Riegler fineness of the fibrides is 95°.

EXAMPLE 16

A 0.1 M aqueous alkaline solution of hexamethylenediamine at a volume rate of 452 l/hr and a concentration of caustic soda of 0.13 mol/l preheated to a temperature of 99°–102° C. is passed through the radial inlet pipe 6 into the cavity 5 formed between the reaction chamber 2 and shell 4 (inside diameter of the reaction chamber is 50 mm) and uniformly exits over the entire circumference at a rate of 0.94 m/sec through the clearance 7 into the reaction chamber 2 forming a continuous curtain of the liquid phase at a distance of 4 mm from the surface of the perforated partition 8. Glutaric acid diacyl chloride at a volume rate of 11.5 l/hr under nitrogen pressure of 3.5 atm.g. is fed into the tuyere 15 of the nozzle mixer 12. The liquid torch effluent from the tuyere 15 is contacted in the diffuser 16 with air supplied through the inlet pipe 14 at a volume rate of 56.5 m³ and preheated to a temperature of 160° C. Upon the interaction of the streams there is formed a mist-like aerosol of glutaric acid diacyl chloride which is further converted, in the gas-phase generation chamber 3, into a vapor-gas mixture superheated to a temperature of 125° C. At this temperature the vapor-gas mixture through the perforated partition 8 with the live cross-section of 25% is passed into the reaction chamber 2 and contacted with the liquid phase at a molar ratio of the monomers in the contacting phases of 2:1 (excess of hexamethylenediamine). In doing so, under the pressure of 2 atm.g. there occur chemical reactions of polyamidation and neutralization. From the resulting gel-like film of polyhexamethyleneglutaramide, fibrides are formed under the effect of the shear stress originating upon phase contact. The reaction mass is passed into a collecting separator through the outlet pipe 20 by the dynamic head of the gas stream. Inert gases, water vapors pass through a hollow shaft of foam suppressor and are delivered into a cooling condenser. The aqueous suspension is fed into a receiving filter. The filtrate with a content of hexamethylenediamine of 0.05 mol/l is fed by means of a centrifugal pump into a liquid-phase collector, while fibrides are washed with water to a neutral reaction and compressed in a centrifuge to a moisture content of 82% and packed into polyethylene bags.

The logarithmic viscosity of the polymer solution in sulphuric acid with a concentration of 0.5 g/dl is equal to 1.4 dl/g. The yield of polyhexamethyleneglutaramide as calculated for glutaric acid diacyl chloride is 98%, the yield of fibrides as calculated for the obtained polyhexamethyleneglutaramide is 100%. The Shopper-Riegler fineness of the fibrides is 92°.

EXAMPLE 17

A 0.2 M aqueous alkaline solution of hexamethylenediamine with a temperature of 90° C. and a volume rate of 170 l/hr is fed into the cavity 5, wherefrom this solution uniformly along the entire circumference of the clearance 7 exits at a rate of 0.5 m/sec into the reaction chamber 2. The solution of terephthalic acid diacyl chloride in methylene chloride with a concentration of 400 g/l and a volume rate of 8.6 l/hr at an inert gas (nitrogen) pressure of 4.5 atm.g. is fed into the tuyere 15 of a pneumatic nozzle. The liquid torch effluent from the nozzle is contacted in the diffuser 16 with steam supplied through the inlet pipe at the weight rate of 64 kg/hr at a pressure of 3 atm.g. and heated to a temperature of 149° C. Upon the interaction of the streams there is formed a fine dispersion of terephthalic acid diacyl chloride in the superheated steam which is further converted, while moving in the vertical plane along the heating surfaces of the gas-phase generation chamber 3, to a vapor-gas mixture heated to a temperature of 200° C. At this temperature and a monomer concentration of 0.6 mol/m³ of the carrier, the vapor phase through perforations of the partition 8 with a free cross-section of 25% passes into the reaction chamber 2 and is contacted with the liquid phase in a state of continuous flow oriented in the horizontal plane of the reaction chamber 2. At a pressure of 2 atm.g. in the reaction chamber 2 there occur chemical reactions of polyamidation and neutralization, as well as the process of forming fibrides from the gel-like film of the polyamide. A portion of steam is condensed upon contacting the liquid phase, the additional condensate improves the conditions of transportation of the reaction polymer mass, lowers the total consumption of the carrier of the liquid phase and makes it possible to increase the monomer concentration therein. The reaction mass is transported, under steam pressure, into a collecting separator through an intermediate cooler, wherein the major portion of steam is condensed. The non-condensed steam and vapors of methylenechloride are fed, through a hollow shaft of the deskimmer, into a cooling condenser. The condensate is accumulated in a drop-deflector mounted before the atmospheric stack and recycled to the process for the preparation of the starting solution of terephthalic acid diacyl chloride. The aqueous suspension of the polymer under pressure is continuously withdrawn from the collecting separator into the receiving filter, wherein the polymer is separated from the aqueous alkaline solution of hexamethylenediamine, washed, squeezed in a centrifuge and packed. The filtrate diluted with the process steam condensate is recycled to the process for the preparation of the starting aqueous alkaline solution of hexamethylenediamine.

The resulting polyhexamethyleneterephthalamide has the form of filament-film fibrides; the yield thereof is 91%. The logarithmic viscosity of the polymer solution in sulphuric acid with a concentration of 0.5 g/dl is 0.64 dl/g. The Shopper-Riegler fineness of the fibrides is 92°.

EXAMPLE 18

Under conditions similar to those described in the foregoing Example 17, a 0.1 M aqueous alkaline solution of hexamethylenediamine preheated to a temperature of 90° C. is fed into the reaction chamber 2 at a volume rate of 230 l/hr. The generated vapor phase with a concentration of terephthalic acid diacyl chloride of 0.2 mol/m$^3$ is continuously fed, under a total pressure of 1 atm.g. with a weight rate of the carrier (steam) superheated to a temperature of 145° C., of 120 kg/hr, through the perforations of the partition 8 into the reaction chamber 2, wherein it reacts with the liquid phase. Separation of the reaction mass at the switched-off centrifugal foam suppressor takes place in the receiving filter communicating with the atmosphere through a vent pipe.

The resulting product-fine fibrides with a highly developed surface area and Shopper-Riegler fineness of 80°. The yield of polyhexamethyleneterephthalamide is 89%. The logarithmic viscosity of the polymer solution in sulphuric acid with a concentration of 0.5 g/dl is equal to 0.48 dl/g.

EXAMPLE 19

Under conditions similar to those specified in Example 17, from hexamethylenediamine and terephthalic acid dichloroanhydride polyhexamethyleneterephthalamide is obtained, with the only difference being that generation of the gas phase is effected from a melt of terephthalic acid diacyl chloride superheated to a temperature of 146° C. and steam at a pressure of 4 atm.g. superheated to a temperature of 200° C. The contact of the reacting phases occurs at the site of the junction of the tapered cones 9 and 10. The entire steam is condensed in an intermediate cooler mounted between the reaction chamber 2 and a receiving filter connected to the atmosphere. There is no exhaust to the atmosphere, the sections of foam-suppression and condensation are absent. The process steam condensate with the filtrate is recycled to the process for the preparation of the liquid phase of the starting products. The logarithmic viscosity of the solution of the polymer in sulphuric acid with a concentration of 0.5 g/dl is equal to 0.9 dl/g. The resulting fibrides are thin fibers with a Shopper-Riegler fineness of 90°, and mean average length of 138 dcg. The yield of polyhexamethyleneterephthalamide is equal to 96% as calculated for terephthalic acid dichloroanhydride.

EXAMPLE 20

A 0.1 M aqueous alkaline solution of 4,4'-dihydroxydiphenylpropane with a volume rate of 209 l/hr and a temperature of 102° C. is fed by means of a centrifugal pump into the cavity 5 between the reaction chamber 2 and the shell 4, wherefrom it exits at the rate of 0.5 m/sec into the reaction chamber 2 through the clearance 7 with a diameter of 50 mm and a height of 0.7 mm. Air heated to a temperature of 160° C. with a volume rate of 15 m$^3$/hr is passed through the inlet pipe 14 into the diffuser 16 and serves to disperse, to an aerosol state, isophthalic acid diacyl chloride supplied under a nitrogen pressure of 3.5 atm.g. through the tuyere 15 into the diffuser 16 in the state of a superheated melt at a volume rate of 5.3 l/hr. The vapor-gas mixture generated in the evaporator-superheater 18 is fed at a temperature of 200° C. through perforations of the partition 8 with a free cross-section of 25% into the reaction chamber 2, wherein it is contacted with the aqueous alkaline solution of 4,4'-dihydroxydiphenylpropane. The three-phase mobile foam formed as a result of said chemical and physical processes and containing polymeric particles of poly-4,4'-dihydroxydiphenylpropaneisophthalate (polyarylate D-1) is withdrawn from the reaction chamber 2 by the dynamic flow of the gas phase and then subjected to separation. The aqueous suspension of the polyarylate is filtered, the separated polymer is washed, dried and packed.

The logarithmic viscosity of a 0.5% solution of the resulting polymer in a mixture of 60 parts by weight of phenol and 40 parts by weight of tetrachloroethane is 0.35 dl/g. The fibrides are of a small particle size. The yield of poly-4,4'-dihydroxydiphenylpropaneisophthalate is 77.6% as calculated on isophthalic acid diacyl chloride. The Shopper-Riegler fineness is 40°.

EXAMPLE 21

Under conditions similar to those described in Example 20, from 4,4'-dihydroxydiphenylpropane and terephthalic acid dichloroanhydride there is obtained poly-4,4'-dihydroxydiphenylpropaneterephthalate (polyarylate D-2).

The logarithmic viscosity of a 0.5% solution of the resulting polymer in a mixture of 60 parts by weight of phenol and 40 parts by weight of tetrachloroethane is equal to 0.3 dl/g. The resulting fibrides have a small particle size. The yield of poly-4,4'-dihydroxydiphenylpropaneterephthalate is 75% as calculated for terephthalic acid diacyl chloride. The Shopper-Riegler fineness is 35°.

EXAMPLE 22

Under the conditions similar to those described in the foregoing Example 20, from 4,4'-dihydroxydiphenylpropane and a mixture of diacyl chlorides of isophthalic and terephthalic acids in the ratio of 1:1 there is obtained a copolyarylate of diphenylpropane and diacyl chlorides of iso- and terephthalic acids. The logarithmic viscosity of a 0.5% solution of the copolyarylate in a mixture of 60 parts by weight of phenol and 40 parts by weight of tetrachloroethane is 0.32 dl/g. The yield of the copolyarylate is 76% as calculated for the total amount of the reacted diacyl chlorides of phthalic acids. The Shopper-Riegler fineness is 40°.

What is claimed is:

1. A process for producing fibrides of a synthetic heterochain polymer comprising:

the polycondensation of a thin film liquid stream of an aqueous alkaline solution of at least one bifunctional compound to be acylated with superheated vapors of at least one diacyl halide of a dicarboxylic acid;

said bifunctional compound supplied to the reaction zone as a continuous thin film liquid stream oriented in the horizontal plane of the reaction zone;

said diacyl halide of a dicarboxylic acid supplied to the vertical plane of the reaction zone with a stream of carrier gas;

the contacting and polycondensation of the reagents occurring at the gas-liquid interface in a cross-current stream under conditions of shear stress; and recovering the substantially totally fibride polycondensation product.

2. The process of claim 1, wherein said bifunctional compound is a monomer selected from the group consisting of diamines and dihydric phenols.

3. The process of claim 2, wherein the diamines are selected from the group consisting of ethylenediamine, tetramethylenediamine, hexamethylenediamine, dodecamethylenediamine, a mixture of ethylenediamine with hexamethylenediamine, piperazine, N, β-aminoethylenepiperazine, methylpiperazine, metaxylylenediamine, para-xylylenediamine, and a mixture of para and meta-xylylenediamines.

4. The process of claim 2, wherein the dihydric phenols are selected from the group consisting of 4,4'-dihydroxydiphenylpropane, phenolphthalein, resorcinol, and hydroquinone.

5. The process of claim 1, wherein the diacyl chlorides of dicarboxylic acids are selected from the group consisting of oxalic acid, glutaric acid, azelaic acid, adipic acid, sebacic acid, fumaric acid, isophthalic acid, terephthalic acid, diphenyloxide-4,4'-dicarboxylic acid, mixtures of fumaric and terephthalic acid, and mixtures of isophthalic and terephthalic acids.

6. The process of claim 1, wherein the carrier of the superheated vapor of diacyl chlorides of dicarboxylic acids is selected from the group consisting of steam, air, and mixtures thereof.

7. The process of claim 1, wherein the concentration of the diacyl chlorides of dicarboxylic acids supplied into the reaction zone is about 0.1 to 5 mol/m$^3$ of the carrier.

8. The process of claim 1, wherein the polycondensation is conducted at a pressure of about 0.5 to 2 atm and a temperature of about 90° to 105° C.

9. The process of claim 1, wherein the linear speed of the stream of diacyl chlorides of dicarboxylic acids is about 2 to 12 m/sec and the speed of the continuous stream of the aqueous alkaline solution into the reaction zone is about 0.5 to 6 m/sec.

* * * * *